UNITED STATES PATENT OFFICE.

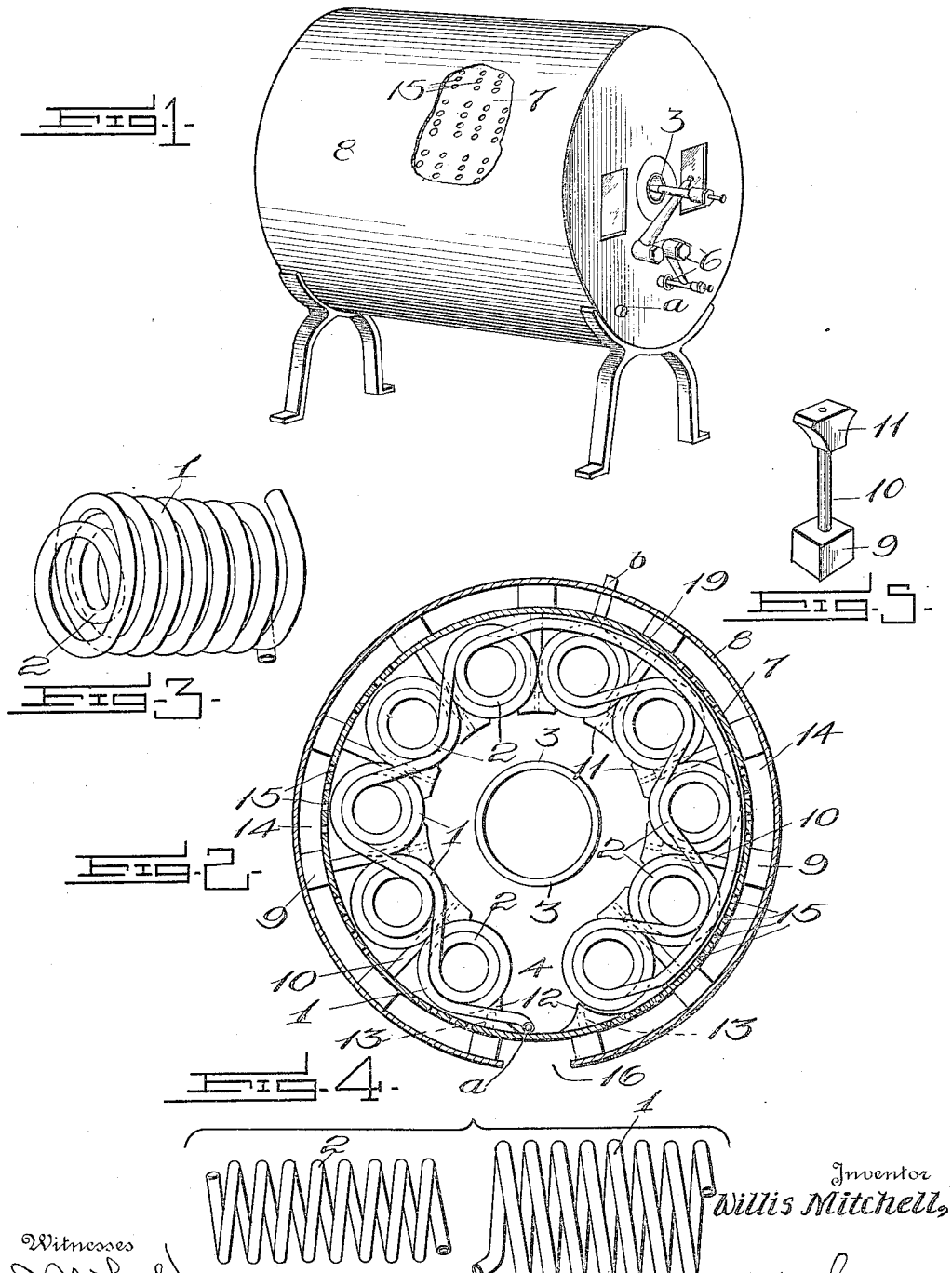

WILLIS MITCHELL, OF MALDEN, MASSACHUSETTS, ASSIGNOR TO WILLIS MITCHELL COMPANY, INC., OF NEW YORK, N. Y., A CORPORATION OF NEW YORK.

STEAM-GENERATOR.

1,139,431. Specification of Letters Patent. Patented May 11, 1915.

Original application filed September 29, 1913, Serial No. 792,297. Divided and this application filed July 27, 1914. Serial No. 853,443.

*To all whom it may concern:*

Be it known that I, WILLIS MITCHELL, a citizen of the United States, residing at Malden, in the county of Middlesex and State of Massachusetts, have invented certain new and useful Improvements in Steam-Generators, of which the following is a specification.

This invention relates to steam generators using helical coils and consists in the construction and combination of parts hereinafter more particularly set forth and claimed.

In the accompanying drawings: Figure 1 represents a perspective view of my steam generator, the outer shell being partly broken away; Fig. 2, represents on a larger scale a front elevation of my steam generator, the front wall being removed to exhibit the series of double helices in position, the burner, gas-generator and pilot therefor being omitted; Fig. 3 represents on a still larger scale a detail perspective view of one of the double helices; Fig. 4 represents the two helices composing it, separated and side by side; and Fig. 5 represents a detail view of one of the bolts.

The continuous water and steam pipe of my steam generator enters through the exterior casing thereof at $a$, preferably in the bottom, and leaves it at $b$, preferably in the top, being wound between these points into a nearly circular series of double helices, each of which consists of an outer helix 1 and an inner helix 2, this series being arranged against the circular wall of the generator and around its horizontal burner 3, leaving a space 4 (Fig. 2) at the bottom, below said burner, for the generator and its pilot preheating devices. The forward parts of the burner and said generator and devices extend through the front wall of the outer casing at 3 and 6 as shown in Fig. 1, said gas-generator and appurtenances and the burner being omitted from Fig. 2 for greater clearness and because they are not a part of this invention, their position being sufficiently indicated by Fig. 1, to aid in explaining the action of the relevant elements.

The cylindrical body of the generator casing is formed of two concentric cylindrical shells 7 and 8, which are spaced apart by nuts 9 on bolts 10, the shanks of which pass between the proximate helices and are provided with broad wedge-form heads 11 for holding them in place. At the ends of the series screw-tapped nuts 12 similar in form to said head 11 are engaged by short screws 13, the heads of which have the form and function of nuts 9, and drawn into the angles between the terminal helices of the series and the inner casing shell 7. By these devices 9, 10, 11, 12 and 13 all the helices are securely clamped in position and a draft space 14 is provided also by them between the two shells of the casing. As the products of combustion are inoffensive and not great in volume, no smoke flue or funnel is needed, but the inner shell 7 is provided at numerous points with small outlet holes 15, compelling a general distribution of the said products of combustion and heat among all the coils of the helices before making their escape into space 14. The outer shell 8 has only a single outlet 16, which is in its bottom, compelling the small streams of such heated gaseous matter, after they issue through holes 15, to pass along or around the inner shell 7 through space 14, converging at this final bottom outlet. They are hardly perceptible to one standing near, as there is no smoke nor steam and the combustion is nearly perfect, mainly by reason of improvements in the generator and burner; but also to some extent because of the tortuous path which they are compelled to follow after leaving the burner, during the earlier part of which they are in or very near the flames and afterward in close contact with the heated inner shell 7.

Preferably the first winding of the water tube is in the form of the outer cylindrical helix 1 of the first double helix, reversing at the rear end thereof to wind the inner helix 2 of the same concentrically within it, then it passes to the outer helix 1 of the next double helix, beginning again at the forward end thereof and so continues until half the series is wound, then passing in a long curve 19 outside of the position of the remainder of the series and beginning at the front end of the inner helix 2 of the last double reversing helix, reversing at the rear of this to wind the outer helix 1 of said double helix, then winding the inner helix of the next double helix, and so backward to the middle of the top of the series, where it ends at *b*. Thus the water as it turns to steam and then is superheated, flows around the burner and subject to its heat in a very devious current, which is suddenly reversed at the end of the first helix of each double helix, the direction from left to right being changed to that from right to left for example in each double helix of the first half of the series, and the direction from right to left being similarly changed to that from left to right in each double helix in the second half of the series, also the general course being toward the top of the series in both halves thereof. Furthermore, the winding in reversed series makes the two helices in each double helix cross each other and intercept more perfectly the radiant heat and hot gaseous matter flowing from the burner into and through said helices, in order that it may be applied to the best effect. This is aided by the provision for escape in minute quantities through small outlet holes at many points, as above stated. With such a construction of the shell and helices very little of the heat can fail of doing its full service. But, in addition, the frequent interruptions and reversals of the water and steam current will tend to break up the particles thereof, to lessen the cohesion and bring it more nearly to a finely gaseous state, as is obvious when streams visibly dash together, producing spray and mist, or are torn into vapor by contact with obstacles or friction along their beds. This enables the heat to act with greater efficacy, a part of its work being done for it by mere strain, jar and attrition. Also there must be a generation of electricity and perhaps other subtle vibratory action, contributing to the comminuting and gasifying action. The influx at the bottom of the generator has been found more efficient and satisfactory than if it were at the top, requiring the final flow to be downward, as the heat of course rises and thus the greatest heat is at the upper part of the generator, being applied to, and greatly superheating, the steam before discharge.

Having thus described my invention, what I claim as new and desire to secure by Letters Patent is:

1. In combination with a calorific device, a water and steam tube wound into a continuous series of double helices, each consisting of an outer helix and an inner helix, each inner helix being connected to the outer helix of a proximate double helix and the direction of winding being reversed in passing from each double helix to the next in order to reverse the flow in each double helix and aid the heat action by the consequent disintegrating friction and strain on the fluid, said series of double helices also being approximately circular and arranged about said calorific device.

2. In combination with a calorific device, a water and steam tube wound into a series of horizontal double helices arranged around said device, the direction of winding being reversed in each double helix in passing from the outer to the inner helix for one half of the series and in passing from the inner to the outer helix for the other half of the series, the general direction of the flow being from the bottom to the top of the series in both halves thereof, and said flow entering the series at the bottom, but leaving it at the top.

3. In combination with a series of continuous tubular double-helices for the passage of water in the process of being transformed into steam and its original gaseous elements, a burner centrally arranged with respect to the series and directing its flames, radiant heat and products of combustion into said helices, the coils of the two concentric helices of each member of the series being reversely inclined with respect to each other in order that they may cross one another for more perfect interruption and utilization of such flames, products and heat.

4. In combination with an approximately circular series of generating helices of a steam-generator and a burner arranged centrally within the same, a cylindrical shell surrounding said helices and having many outlet perforations at divers points which compel the products of combustion to flow through and around all parts of the coils of said helices in addition to the direct action of the burner on the latter and an outer casing which leaves a space between it and said perforated casing.

5. In combination with a series of horizontal, connected water-tube helices and a burner approximately surrounded thereby, a horizontal generator casing consisting of two concentric shells, the inner shell being provided with numerous holes at various points of its circumference and the outer shell being arranged to leave an interval between them and provided with a single outlet in its bottom.

6. In combination with an approximately circular series of connected tubular horizontal steam generating double helices and a burner centrally arranged in said series, a double walled casing inclosing said helices and burner and providing a draft space between its walls, the inner wall or shell of said casing being provided with numerous small perforations at divers points, and the outer wall or shell of the same having an outlet at its bottom.

7. In combination with the water-tube helices and burner of a steam generator, a double-walled casing thereof and fastening devices, each of which devices is adapted to aid in holding the casing walls apart and also in holding said helices in place.

8. In combination with a circular series of water-tube helices and the surrounding casing of a generator, a series of bolts passing inward from said casing between said helices and a series of wedge-form nuts turning on said bolts, each of said nuts serving to clamp in place the helices on each side of it.

9. In combination with a circular series of water-tube helices and the double-walled casing of a generator inclosing the same, a series of bolts, each of which has a head fitting between the walls of said casing to hold them apart and extending inward between said helices and a series of wedge-form nuts turning on said bolts to clamp in position the helices on each side of each nut.

10. In combination with a generator casing and a nearly circular series of water-tube helices therein, having a gap at the bottom, a pair of wedge-form nuts fitting against the terminal helices and the contiguous face of the casing and a pair of screws having heads interposed between the two walls of said casing to aid in keeping them apart and engaging said nuts to aid in clamping the series of helices in operative position.

In testimony whereof, I have signed my name to this specification in the presence of two subscribing witnesses.

WILLIS MITCHELL.

Witnesses:
 MARGARET ALEXANDER,
 FRANK H. ROUZEE.

Copies of this patent may be obtained for five cents each, by addressing the "Commissioner of Patents, Washington, D. C."